April 14, 1959  R. F. LANTHIER  2,881,606
PATTERN CHAIN ATTACHMENT
Filed April 20, 1956  4 Sheets-Sheet 1
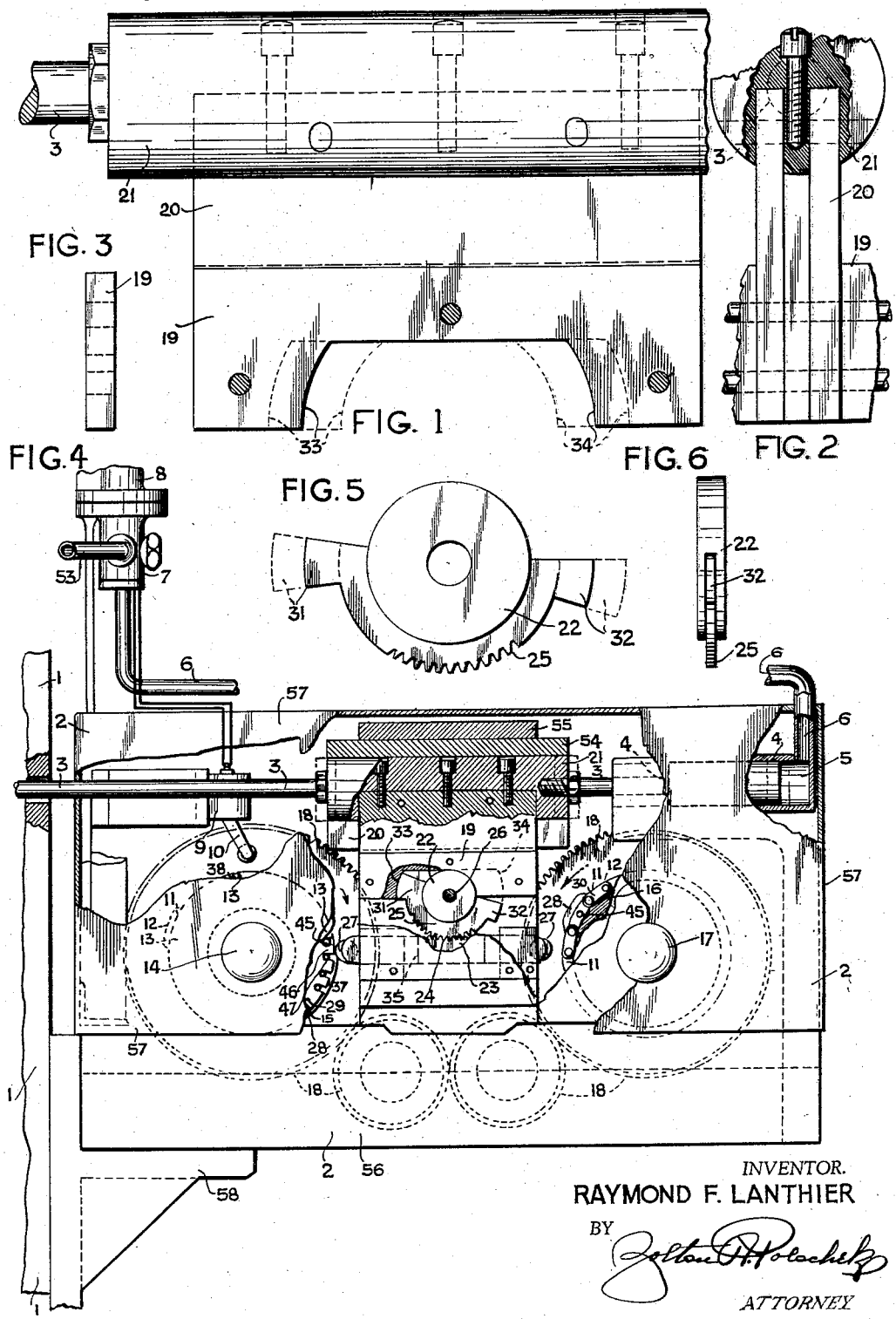
INVENTOR.
RAYMOND F. LANTHIER
BY
ATTORNEY

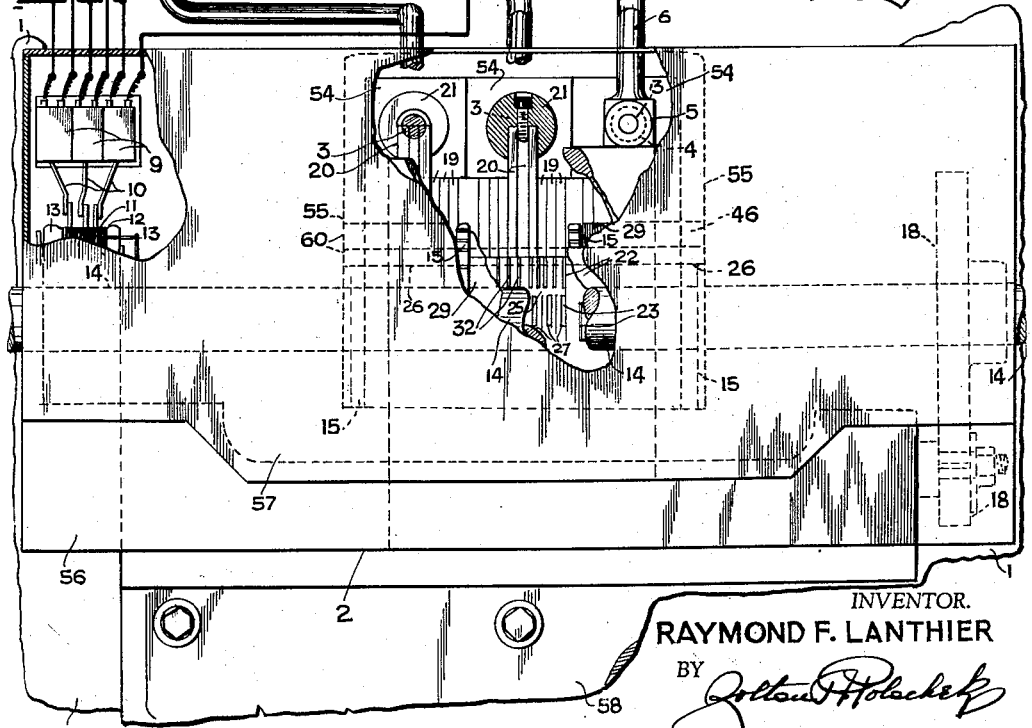

April 14, 1959 R. F. LANTHIER 2,881,606
PATTERN CHAIN ATTACHMENT
Filed April 20, 1956 4 Sheets-Sheet 3
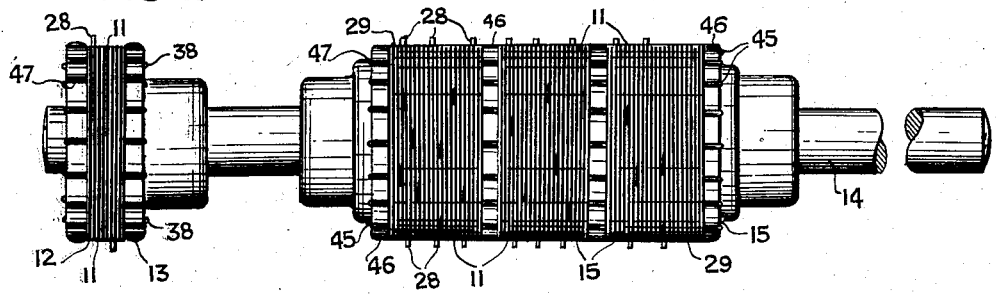
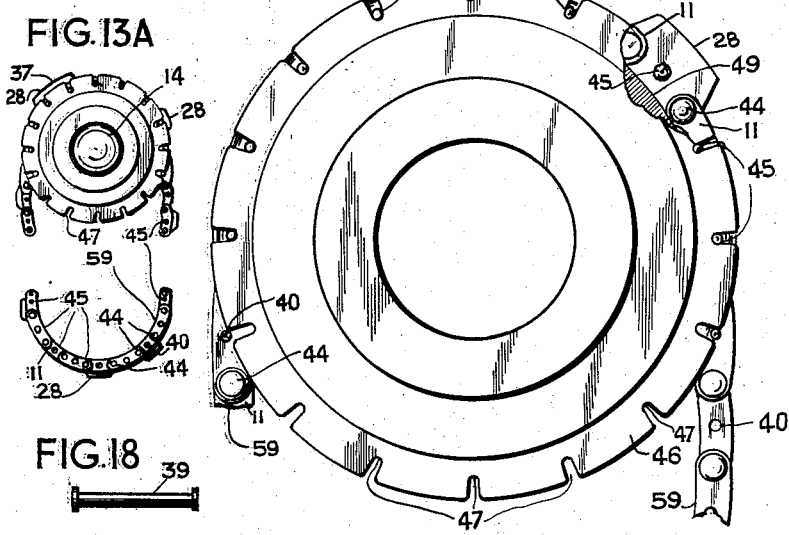
INVENTOR.
RAYMOND F. LANTHIER
BY
ATTORNEY April 14, 1959 R. F. LANTHIER 2,881,606
PATTERN CHAIN ATTACHMENT
Filed April 20, 1956 4 Sheets-Sheet 4
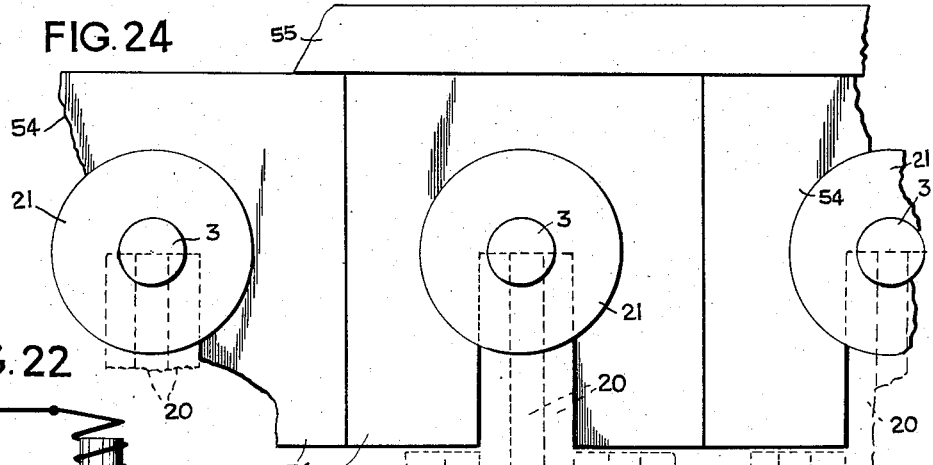
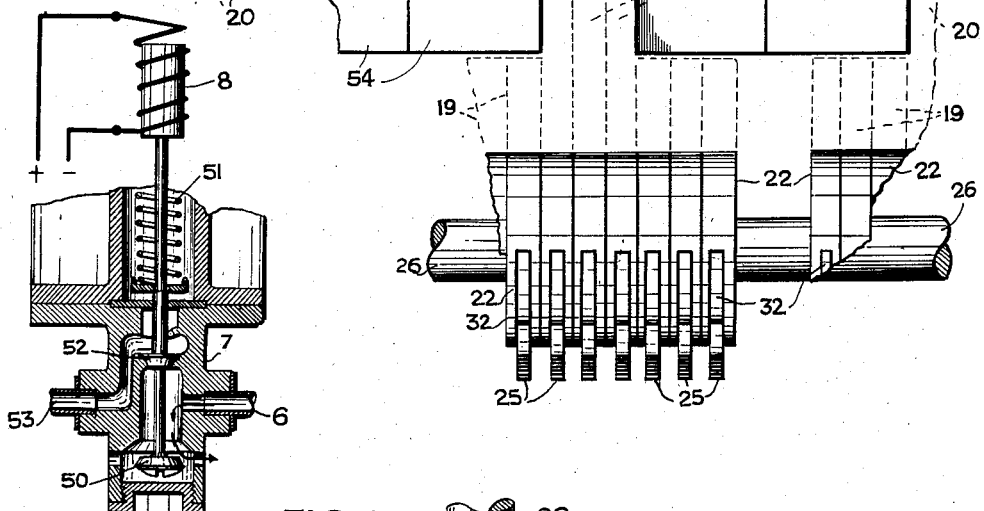
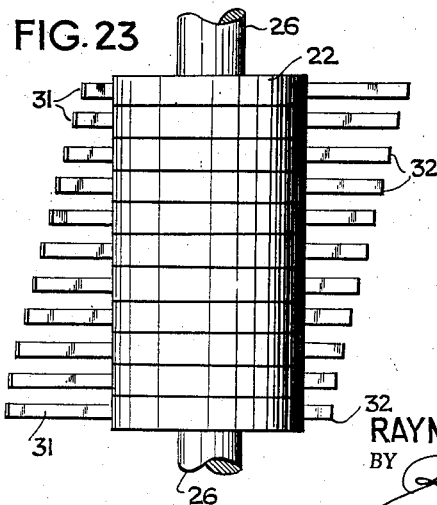
INVENTOR:
RAYMOND F. LANTHIER
BY
ATTORNEY United States Patent Office 2,881,606
Patented Apr. 14, 1959

2,881,606

PATTERN CHAIN ATTACHMENT

Raymond F. Lanthier, Lake Success, N.Y.

Application April 20, 1956, Serial No. 579,610

7 Claims. (Cl. 66—86)

My invention relates to a pattern chain attachment, particularly a shogging means for warp knitting machinery and more particularly to providing automatic means for a precise limitation of movement in mechanisms wherein a great variety of such precise movements are desired at high speed, for instance a chain pattern shogging mechanism for Raschel type looms.

Among the objects and purposes of my device is to increase the working speed of the machine and to decrease the number and need of precision as well as the load on the pattern links usually required for pattern changes in the operation of high speed warp knitting machines.

An object is to substitute cheap links, at a fraction of the cost and at a fraction of the number required, yet with greater life and accuracy than is now required of the precision ground pattern links of Raschel type warp knitting machines, when producing lace for example.

An object is to provide a mechanism which removes the load and consequent wear from the pattern links of a warp knitting machine or the like.

Another object is to provide a pattern link for warp knitting machines which controls, rather than moves the guide bars of the needles to shog them.

Another object is to provide mass produced stampings in lieu of the pattern links now used in warp knitting machines.

Another object is to provide a pattern chain for warp knitting machines in which all of the links are of the same shape regardless of the gauge of the machine and the shog required.

Another object is to provide a warp knitting machine shogging device in which the height of all of the lower links is the same for the entire chain and the so called high links and repeat high links are inserted without changing any of the links, and additionally, all of the high links are the same height regardless of the number of needles shogged or the gauge, thus three link parts serve the purpose of many hundred now used for the same purpose.

Another object is to provide universal links for pattern chains for knitting machines, which are the same regardless of the gauge of the machine or shog; a few stops and stop blocks being interchangeable for all machines.

An object is to provide pattern chain links which do not require grinding to suit one shog or another, thus saving great numbers of links which are now seldom if ever used again in making up a new chain; the time and cost lost in grinding links thus being eliminated.

An object is to reduce the shock, now experienced when the jump from a high link to a low link occurs, this being so because the links do not, by themselves, make the shog; they merely control it.

An object is to simplify the make up of the chain for a new pattern for a knitting machine as my chain may be a part of the device since pattern changes are accomplished by inserting the high links into the existing chain.

Still another object is to provide a pattern chain for knitting machines which, when the loose pins are removed, the chain still remains in tact, as the loose pins; those that engage the notches in the rims of the chain drums are not used to hold the chain together, but rather to secure the high links as they are inserted between the links of the chain.

An object is to provide a pattern chain which is not effected in the shog of knitting machines by chips or foreign matter lodged on the chain end which its high links or is not effected by wear since the links move the stop discs which may be moved more or less without changing the shog the slightest degree.

I accomplish these and other objects by the construction herein disclosed and shown in the accompanying drawings in which:

Fig. 1 is a side elevational view of the stop block assembly.

Fig. 2 is an edge view of the assembly.

Fig. 3 is a front elevation of a stop block.

Fig. 4 is a side elevational view of my device with parts removed to show other parts otherwise hidden from view.

Fig. 5 is a side elevational view of a stop disc.

Fig. 6 is a front elevation of a stop disc.

Fig. 7 is a plan view of a pusher bar or a cam follower.

Fig. 8 is a side elevation of a pusher bar or cam follower.

Fig. 9 is a front elevation of my device wherein parts are removed to show other parts otherwise hidden.

Fig. 10 is a plan view of a fragment of the links and pins of the pattern chains, wherein the links are straightened out in a common plane.

Fig. 11 is a side elevational view of a fragment of the pattern chain with the links disposed in a common plane.

Fig. 12 is a side elevation of a fragment of the chain and the chain drum on which it is carried.

Fig. 13 is a front elevation of one of the drum shafts, drums and chains.

Fig. 13A is a schematic side elevation of one of the drum shafts, drums and chains extended as loops.

Fig. 14 is an enlarged side elevation of one of the chain drums and part of the chain.

Fig. 15 is a side elevation of one of the links of the pattern chain.

Fig. 16 is a side elevation of one of the high links or cam surface inserts of the pattern chain.

Fig. 17 is a side elevation of one of the cooperative high links for extending the cam surface or dwell of the pattern chain.

Fig. 18 is a plan view of a rivet for securing the links of the valve drum chain.

Fig. 19 is a plan view of one of the rivets for securing the links of a pattern drum chain.

Fig. 20 is a plan view of a loose pin for detachably securing the high links 28 or 37 to the chain for the valve drum.

Fig. 21 is a plan view of a lose pin for detachably securing the high links 28 or 37 to the chains of the pattern drums.

Fig. 22 is a part schematic and part sectional view showing one of the solenoids and control valves.

Fig. 23 is a plan view of one of the groups of assembled stop discs for precisely defining the amount of shog.

Fig. 24 is an enlarged fragmentary front elevational view showing parts of the push rod guides, push rods, stop discs, with the stop blocks being shown in broken lines.

It is not my purpose to describe the many complicated parts and their use in a high speed warp knitting machine or loom of the Raschel type to which my device is particularly suited or other textile machines and apparatus for other purposes and uses to which my device is so well adapted but rather to describe in detail the structure which I employ to overcome the difficulties now experienced and to improve the performance of any machine to which it may be attached or into which it may be built as a part.

Pattern chains and means for shogging the guide bars of the needles of knitting machines are well known and in this simplified form seems a satisfactory manner of providing longitudinal movement to the guide bar with its hundreds of guides, for the threads and yarn, equal to the spacing of the separate guides or a predetermined number of guides in addition to other movements of the bars in the machine during the production of material or knitted fabric. However, the demand for fabrics such as lace and some of the complicated designs now demanded by the public, as in sports wear, tapestry, etc., is such that shogging involves thousands of precision ground links of specially treated and tempered material which collectively provide a plurality of cam faces to move the guide bars precisely the required distance in one direction and to overcome the spring loading of the particular bar so that it may be moved in the opposite direction by the spring; this motion of shogging is repeated from sixty to more than three hundred times a minute.

It may be seen that the weight of the bar and the speed per minute result in considerable wear. By relieving the pattern chain of the load and the precision required to accomplish this action I have been able to increase the speed and load as well as the precision.

My pattern chain links do not move the guide bar but serve to time the action performed by supplementary means such as mechanism for providing all or a part of the reciprocating movement of the guide bar, thus to move the bar in one or both directions rapidly and precisely, yet with many variations in the length as well as the time relationship with the movements of the bar.

I have not attempted to show all possible modifications of the construction of my device but rather have shown and described in detail, a preferred embodiment so that one skilled in the art to which this invention pertains may construct it and practice its use; modifications may suggest themselves after a study of this my disclosure.

The preciseness of the drawings and the preciseness of the detailed description to follow is not intended to limit the scope and breadth of my invention which is set forth in the appended claim.

I have shown a fragment of the frame typical warp knitting machine 1 to which is secured my shogging device 2 having a plurality of push rods 3 for engaging the anvils of the guide bars, not shown, in the usual manner.

Motion is imparted in one direction to the guide bars and the push rods 3 by the pistons 4 in the air cylinders 5 which are supplied with air pressure through the air lines 6 and control valves 7 which are electrically operated by the solenoid 8 and micro-switches 9 by the operators 10 when contacting the high links added to the links 11 of the endless chain 12 which is rotated by the drum 13 which is rotated by the drum shaft 14 of my device.

The drum shaft 14 is provided with a plurality of stop operating pattern link drums 15 which cooperate with the plurality of pattern link drums 16 rotated by the shaft 17 in the opposite direction and driven with the shaft 14 by the gear train 18.

Precise movement limits, for the push rods 3, are provided by the many stop discs 22 and their respective mating stop blocks 19 or 20 which are secured together and to the push rod guide heads 21 which are secured to the push rods 3 and also the pistons 4.

Oscillating movement is imparted to the stop discs 22 by pattern link followers 23 which are provided with racks 24 which engage the segmental racks 25 of the stop discs causing them to take an oscillatory movement about the stop box shafts 26. The followers 23 are each provided with a cam roller 27 at each end for engaging the high links 28 of the pattern chains 29 and 30 carried by the pattern drums 15 and 16 which are rotated by the shafts 14 and 17. When a high link on one of the drums moves the stop disc, a low link permits this movement since there must be a low link on the drum opposite.

The stop extensions 31 and 32, disposed nearly opposite on the stop discs, engage conforming stop surfaces 33 and 34 in their respective stop blocks 19 and 20. The stops 33 limit the movement of the spring pressing the guide bars and the push rods 3 toward my shogging device 2 and the stops 34 limit the movement of the guide bars when operated to overcome the springs by pressure applied to pistons 4, as when moving the push rods 3 toward and into the machine 1. The extensions 31 and 32 vary for the stop discs 22 as shown in Fig. 23 so that, for instance, the radius of the extension 31 on one disc is greater than the extension 31 on the disc adjacent at one side, a distance precisely conforming to the distance or gauge of one thread guide in relation to the adjacent guide as positioned on the guide bar; the extensions 32 varying accordingly, less rather than greater. Each precise variation in the radii of the extensions, such as 31 and 32, are greater or less, as the case may be from the centrally positioned disc, which has extensions 31 and 32 of equal radius. The extensions 31 or 32 of the disc at each end of the particular grouping may be equal to the radius of the disc and the extension 31 or 32 of the disc at the opposite end may be the maximum radius for such extensions.

Referring particularly to Fig. 5 the extensions 31 are disposed substantially ten degrees circumferentially above a horizontal center line through discs 22 and the extensions 32 are shown twenty degrees below the horizontal center line, and as the bottom of each of the stop blocks is positioned to travel along and slightly above the same center line one of the extensions must be in engagement with either stop 33 or 34 and the other of the extensions must be out of engagement with its respective stop.

It is to be here noted that when any one of the chain followers 23 is driven by a high link in one direction away from machine 1, all followers 23 disposed on the side of shoulder 35 of the driven follower are likewise moved in the same direction by engagement of their shoulders 36 against the shoulders 35 of the adjacent followers. The followers disposed on the side of the shoulder 36 of the driven follower will not move. If any one follower is driven in the reverse direction toward machine 1, then all followers on the side of the shoulder 36 of the driven follower will likewise move in the same direction by engagement of their shoulders 35 against the shoulders 36 of the adjacent followers. Thus it is possible to move one or all of a selected group of adjacent followers in one direction or the other depending on which follower is selected by movement of a high link on one of the chains.

The discs 22 are arranged as shown in Figs. 4, 9, 23 and 24 with respect to followers 23 so that the follower 23 which effects movement of all its adjacent followers away from machine 1, will elevate the longest extension 32 along with the shorter extensions 32 of all the other discs. When a disc having an extension 32 of intermediate length is oscillated, all the other discs having shorter extensions are also oscillated in the same direction. The follower 23 which elevates the shortest extension 32 does not move any adjacent follower. The follower 23 which elevates the longest extension 32 when driven in one direction elevates the shortest extension 31 when moved in the reverse direction. When that follower is driven by a high link in the reverse direction that follower does not move any adjacent followers. By driving any one follower in any one direction that follower elevates the extension 31 or 32 of the disc 22 associated therewith and effects elevation of all extensions 31 or 32 shorter than that one associated with the driven follower. Since it is the longest extension which determines the stopping position, the device operates to make the particular driven follower 23, the one which determines the stopping position.

The selective group operation of the followers 23 is desirable because in the knitting process of machine 1, it is often necessary that the extension of a piston 3 into the machine be controlled in steps. To accomplish this, a group of followers 23 can be moved outwardly by a single high link on chain 29 applied to the follower controlling the longest extension 32 to be elevated. Then by camming one follower bar of the previously moved group at a time, the associated extensions 32 of progressively decreasing length can be lowered while their corresponding extensions 31 are raised.

When the push rods 3 are moved by the pistons 4 toward and into the knitting machine 1 by overcoming the springs the push rods travel until stopped by their stops 32 which are moved into position by a particular high link in the pattern chain 29.

Referring particularly to Figs. 13 to 20 inclusive, the important characteristics of the drums, chains and component parts of the cam structure the height and position of the cam faces of which may be varied to import longitudinal movement or shogging to the guide bars by directly pushing against the bars or by overcoming the spring loading of the bars, the cam surfaces moving the bars in one or the other direction are shown. In my device the cam surfaces control the plotting of the pattern while auxiliary, rather than direct means actually move the guide bars and also control the amount of movement precisely.

In my device the pattern chain links are narrow or relatively thin stampings comprising the ordinary or low links 11, as shown in Fig. 15 and high links 28 or 37, as shown in Figs. 16 and 17 as well as in Figs. 10, 11 and 12 and elsewhere. The high links are, in fact not links, but rather inserts which fit in between the ends of the links proper in the make up of the chain, and the chain is not a chain in the usual sense but rather a band around the chain drum, this is so, in my device, as related to the drum 13, for actuating the piston 4, or for the other drums which position the stop discs 22 which determine place and time as well as the length of the shog, or movement of the guide bar, the length of the cam surface of which depends on adding a cooperating high link 37 which continues the dwell in cooperation with the high link 28, as may be seen in Fig. 12, thus the high link 37 is a repeat high link.

The high links 28 or 37 are held in the composite chain by the pins 38, shown in Fig. 20 or by the pins 45, shown in Fig. 21 for the drums 15 and 16. The pins 38 or 45 engage in the center apertures 40, in the links 11 and the center apertures 41 and 42 in the high links 28 or 37. The end apertures 43 receive the rivets 39 and 44 shown in Figs. 18 and 19 and elsewhere.

The drums 13, 15, and 16, all of the drums, are provided with flanges 46 notched precisely at 47, to receive the pins 38 or 45 thus to hold all of the links 11 around their respective drums as well as to each other. The bores 48 and the drum diameters 49 of all the drums are substantially identical. The bores 48 are to suit the driven shafts 14 or 17 to which the drums are secured, one of the shafts being driven by the knitting machine or in precise time with it.

The precise timing of the piston movement by the high links 28 of the chain 12 on the drum 13 may be better understood by referring to Fig. 22 where there is shown a three way valve in which the exhaust valve head 50 is held open by the spring 51. It is adapted to be closed and the pressure valve 52 is adapted to be opened by the solenoid 8 which overcomes the spring. The solenoids are energised electrically by the microswitches 9 as hereinbefore described. The pressure pipes 53 supply air pressure to the valves 7 which in turn, through the pipes 6, force the pistons to move as soon as the exhaust valves are closed and the pressure valves are opened thus to move the push rods 3. The period of time the push rods 3 are forced into the machine 1 is dependent on the use of the high links on the drum and chain as on drum 13 or the high links on the other drums and chains or a combination of the arrangements of high links on all of the drums.

The effect of shogging and the combinations are so extensive that even a brief description of the pattern commonly knit by reason of the many stitches in a warp knitting machine and the making up of the chains to effect these numerous stitches can not help a clearer understanding of my device.

The precision of the movements may be better understood by referring to Fig. 23 which shows an enlarged view of one of the several groups of stops.

In Fig. 24 I have shown a full size detail showing the relationship of the stops as assembled in their respective stop boxes with the stop blocks shown in broken lines with relation to the slide box stops or push rod guides 54 as well as a fragment of the supporting frame 55 which is secured to the base 56 which carries the casing and snap-on panels 57, the base 56 being secured to the machine 1 by means of a bracket 58.

The push rod is moved in one direction by spring means, and in the opposite direction by the air cylinder; double acting air cylinders may also be, in modified form, used to replace the spring so that the shogging means may be by air entirely, or hydraulic, mechanical overlap and clutches or other means may be controlled by my stops and chains to provide the same precision.

The several chains may be girthwise bands around their respective drums or each may comprise a longer chain which hangs in a loop at 59 as shown in Figs. 13A and 14 below its respective drum the pins 38 and 45 which engage the notches 47 act inversely, like a sprocket and chain, the rims of the drums, having notches instead of teeth for engaging the chain. The pins 38 and 45 are kept from substantial longitudinal movement by the guards 60 as now commonly used.

Having thus described a preferred embodiment of my invention what I claim as new and desire to secure by Letters Patent is set forth in the following claims:

I claim:

1. A shogging device for knitting machines and the like, comprising means for imparting movement to the guide bars of the machine and oscillating discs for controlling said movement of said guide bars, pattern chains having high links, and chain followers moved by said high links to oscillate said discs, said chain followers each having a rack and said discs each having a segmental rack intermeshing with its respective rack, and extensions on said discs having varying radii and blocking means secured to said movement imparting means engaging said extensions when movement is in one direction for stopping said movement the movement of said movement imparting means in the opposite direction being permitted.

2. A shogging device having chain means for controlling the reciprocating movement of guide bars of needles of high speed knitting machines and the like, stop means controlled by said chain means for precisely limiting the reciprocation of said bars, and a means independent of said chain means for imparting movement to said bars, said stop means comprising segmental racks, cam followers for engaging said chain means, and racks on said followers for engaging said segmental racks to oscillate said stop means.

3. In combination, a knitting machine having guide and other bars movable lengthwise and shogged to produce a pattern such as lace and other intricate designs, chain means for controlling the pattern and shogging, means controlled by said chain means independent of the movement thereof for imparting precise movements in varying degrees and duration to said bars, the movements of said bars being precisely limited, and oscillating stops for limiting the movements of said bars, said oscillating stops being moved by said chain means.

4. A device for imparting movement to the guide bars of a knitting machine by shogging said guide bars longitudinally, chain means for controlling said movements, stop means and chain followers for oscillating said stop means, said chain followers comprising a plurality of slidable racks, said stop means comprising a plurality of oscillating segmental racks intermeshing with said slidable racks, extensions on said segmental racks disposed to limit the movement of said guide bars in either direction, and engaging means on said chain followers for moving a group of adjacent chain followers simultaneously.

5. A device according to claim 4, wherein the extensions are so disposed that a slight movement of oscillation thereof permits full movement of said guide bars in one direction.

6. A device according to claim 4, wherein said stop means may be oscillated slightly to permit movement of said guide bars in one direction, and means for engaging said extensions and for moving said guide bars, said extensions and the last named means being relatively disengaged by oscillating said stop means.

7. A control for reciprocating movements of knitting machine mechanisms, power means for imparting the reciprocating movements, stop means for limiting the time and degree of said movements, means including a plurality of movable followers for oscillating said stop means whereby a slight movement of said the last named means and said stop means controls a substantially greater movement by said power means, a plurality of said stop means being moved simultaneously by movements of a single one of said followers, and a plurality of interengaging means cooperating with said stop means to move said stop means simultaneously.

References Cited in the file of this patent

UNITED STATES PATENTS

| | | |
|---|---|---|
| 2,106,434 | Morton et al. | Jan. 25, 1938 |
| 2,336,455 | Amidon | Dec. 14, 1943 |
| 2,416,527 | Lacey | Feb. 25, 1947 |
| 2,416,933 | Lynam et al. | Mar. 4, 1947 |
| 2,423,433 | Amidon | July 8, 1947 |
| 2,488,144 | Shortland | Nov. 15, 1949 |
| 2,688,860 | Lambach | Sept. 14, 1954 |
| 2,741,107 | Garner et al. | Apr. 10, 1956 |